United States Patent [19]

Ogasawara et al.

[11] Patent Number: 5,018,124
[45] Date of Patent: May 21, 1991

[54] INFORMATION RECORDING METHOD AND APPARATUS FOR RECORDING INFORMATION ON TRACK POSITIONED AT LEAST TWO TRACKS AHEAD WHEN ABNORMALITY OF TRACKING SERVO IS DETECTED

[75] Inventors: Yutaka Ogasawara; Wataru Sakagami, both of Yokohama, Japan

[73] Assignee: Canon Kabushiki Kaisha, Tokyo, Japan

[21] Appl. No.: 173,469

[22] Filed: Mar. 25, 1988

[30] Foreign Application Priority Data

Mar. 31, 1987 [JP] Japan .................................. 62-077961

[51] Int. Cl.$^5$ ............................ G11B 7/00; G11B 7/09
[52] U.S. Cl. ................................. 369/44.330; 369/58; 369/44.32; 235/454
[58] Field of Search ...................... 369/43, 44, 46, 53, 369/54, 58, 59, 44.33, 44.39, 44.32, 44.28, 44.29; 235/454, 487, 455

[56] References Cited

U.S. PATENT DOCUMENTS

| | | | |
|---|---|---|---|
| 3,624,284 | 11/1971 | Russell | 369/44.13 |
| 4,519,056 | 5/1985 | Kimoto et al. | 369/53 |
| 4,554,652 | 11/1985 | Maeda et al. | 369/54 |
| 4,571,716 | 2/1986 | Szerlip | 369/54 |
| 4,598,393 | 7/1986 | Pierce | 369/44.26 |
| 4,669,072 | 5/1987 | Miura et al. | 369/54 |
| 4,719,610 | 1/1988 | Bates et al. | 369/44.28 |
| 4,730,290 | 3/1988 | Takasago et al. | 369/58 |
| 4,731,771 | 3/1988 | Maeda et al. | 369/44.29 |

FOREIGN PATENT DOCUMENTS

| | | |
|---|---|---|
| 081184 | 6/1983 | European Pat. Off. . |
| 61-208671 | 9/1986 | Japan . |
| 61-240408 | 10/1986 | Japan . |
| 2175123 | 11/1986 | United Kingdom . |

Primary Examiner—Stuart S. Levy
Assistant Examiner—Robert A. Weinhardt
Attorney, Agent, or Firm—Fitzpatrick, Cella, Harper & Scinto

[57] ABSTRACT

An information recording method for recording information on one of a plurality of tracks provided in parallel with each other on an information recording medium while performing a tracking servo operation has a characteristic that when an abnormality of the tracking servo operation is generated during the recording of information on a track, information the same as the above-mentioned information is recorded again on a track which is positioned at least two tracks ahead of the one track. An information recording apparatus for performing the above method includes: a recording device for recording information on one of the tracks, a shifting device for shifting the recording device onto another track; a tracking servo device for performing a tracking servo of the recording operation with respect to a track; a detecting device for detecting abnormality of the tracking servo operation; and a control arrangement for causing the shifter to move the recording device to a new track positioned at least two tracks ahead of the one track when the detecting device detects abnormality of the tracking servo operation, whereby information, the same as the information being recorded when the abnormality is generated, is recorded again on the new track.

14 Claims, 7 Drawing Sheets

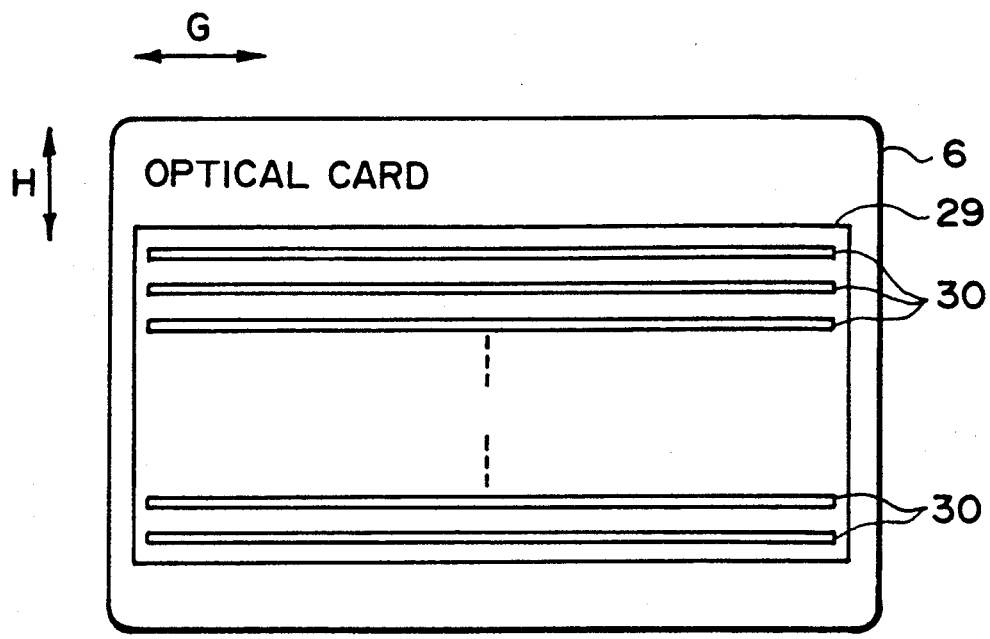
F I G. 4
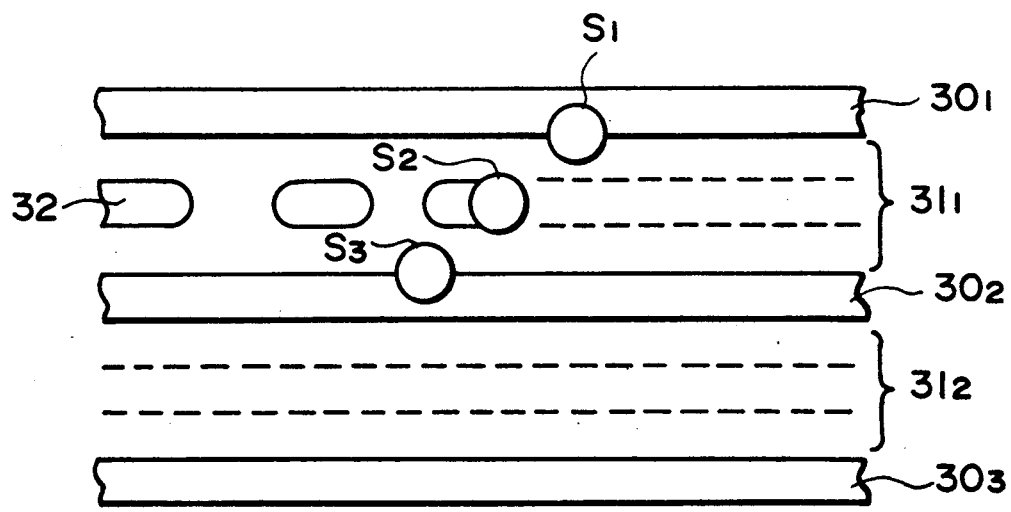
F I G. 5

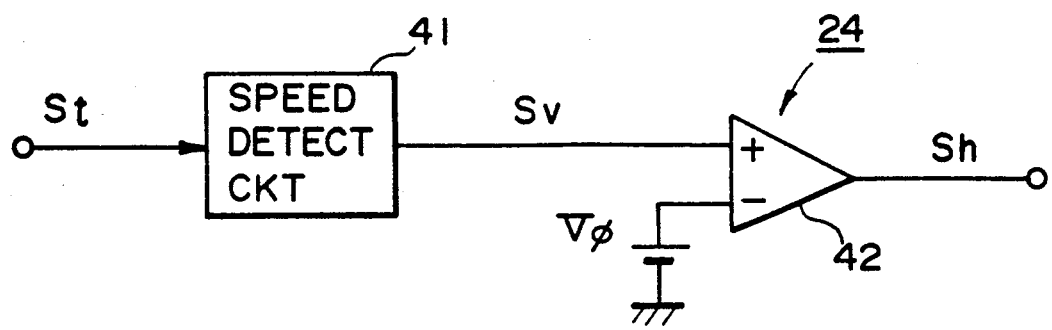
FIG. 8
FIG. 9A
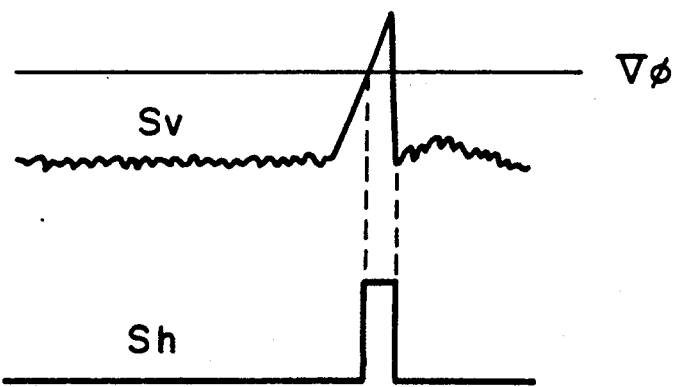
FIG. 9B
FIG. 9C

INFORMATION RECORDING METHOD AND APPARATUS FOR RECORDING INFORMATION ON TRACK POSITIONED AT LEAST TWO TRACKS AHEAD WHEN ABNORMALITY OF TRACKING SERVO IS DETECTED

BACKGROUND OF THE INVENTION

1. Field of the Invention

The present invention relates to a recording method for recording information on one of a plurality of information tracks provided in parallel with each other on an information recording medium while performing a tracking servo operation. The present invention also relates to a recording apparatus for performing the above recording method.

2. Related Background Art

Conventionally, as information recording mediums on which information is recorded or from which information is read out, various types, such as a discshaped one, card-shaped one, tape-shaped one or the like, are already known. In addition, recently, a recording method for recording and/or reading out the information with respect to such a recording medium by applying a light beam condensed as a light spot to the recording medium has been noted with success because the recording density has been considerably increased.

Here, such a recording method will be explained, taking the case of a card-shaped optical recording medium (referred to as "optical card" hereinafter) as an example.

FIG. 1 is a schematic plan view of the optical card, and FIG. 2 shows a portion of the optical card in an enlarged scale.

In FIG. 1, reference numeral 1 denotes an optical card, numeral 2 denotes an information track, and numeral 3 denotes a home position. On the optical card 1, information is recorded as a row of optically detectable recording bits (information track) by scanning the card 1 by means of a light beam which is modulated in accordance with the information to be recorded and which is condensed or focused as a minute light spot. In this case, in order to correctly record and/or reproduce the information without trouble such as crossing of the information tracks 2, it is required that a position of the light beam (spot) applied to the card be controlled in a direction perpendicular to a scanning direction (automatic tracking referred to as "AT" hereinafter). Further, it is also required that the light spot be controlled in a direction perpendicular to a plane of the optical card (automatic focusing referred to as "AF" hereinafter) in order that the minute light spot be stably applied to the card regardless of bent or distortion of the card and/or mechanical errors. As shown in FIG. 2, between two adjacent information tracks 2 ($2_1$, $2_2$, ...), there are provided tracking tracks 5 ($5_1$, $5_2$, ...), for effecting the abovementioned AT.

Next, the recording process for recording information on the optical card will be explained.

In FIG. 1, at first, the light spot is positioned in the home position 3. Next, the light spot is shifted in a direction D (FIG. 1) to find an information track $2_n$ to be recorded; then, the light spot scans, the track $2_n$ in a direction F, thereby recording or reproducing the information with respect to the track $2_n$. A track number has also been recorded on each of the information tracks. Thus, it is possible to find the information being now recorded, by reproducing the information regarding the track numbers. The recording of information is effected in postscript fashion in order of the information tracks $2_1$, $2_2$, ... $2_n$.

When there are flaws or scratches on the optical card or when dirt and/or dust sticks to the optical card, as well as when a defect portion exists on a recording layer of the optical card, in some cases, recording of information cannot be correctly effected. In order to avoid such demerit, the Japanese Patent Laid-Open Application No. 240408/1986 (corresponding to U.S. Ser. No. 850,830) proposes a method for verifying if information has been correctly recorded by reproducing the information immediately after this information is recorded. In this method, when an error is detected, the same information is recorded on a next track.

However, when the defect portion and the like on the optical card is so large as to stride a plurality of the tracks, abnormality of the tracking servo operation (phenomenon that the light spot cannot correctly trace the information track due to AT out of track) is generated, as well as mechanical errors are generated. In this case, since in the above proposed method the re-recording operations must be successively repeated, there arises a problem that it takes a long time for restoring a normal recording condition.

SUMMARY OF THE INVENTION

An object of the present invention is to provide an improved information recording method and apparatus which can solve the above problems and which can restore a normal recording condition in a short time even when the information recording medium has a large defect portion.

The above object of the present invention can be achieved by re-recording the same information on a track positioned two tracks ahead when abnormality of the tracking servo is generated during the recording of information.

Further, an apparatus for performing such re-recording operation comprises:

recording means for recording information on one of the tracks;

shifting means for shifting the recording means to another track;

tracking servo means for performing a tracking servo operation with respect to a track to which the recording means is associated;

detecting means for detecting abnormality of the tracking servo operation; and control means for causing the shifting means to move the recording means to a new track positioned two tracks ahead when the detecting means detects the abnormality of the tracking servo operation, whereby information the same as the information being recorded when the abnormality is generated, is recorded again on said new track.

BRIEF DESCRIPTION OF THE DRAWINGS

FIG. 4 is a schematic plan view of an optical card on which information is recorded by the apparatus of FIG. 3;

FIG. 5 is a partial enlarged view of the optical card of FIG. 4, showing an aspect of the recording;

FIG. 8 shows an embodiment of an abnormal AT detecting circuit;

FIGS. 9A to 9C show output signals emitted from the circuit of FIG. 8;

DESCRIPTION OF THE PREFERRED EMBODIMENTS

Figure 1:
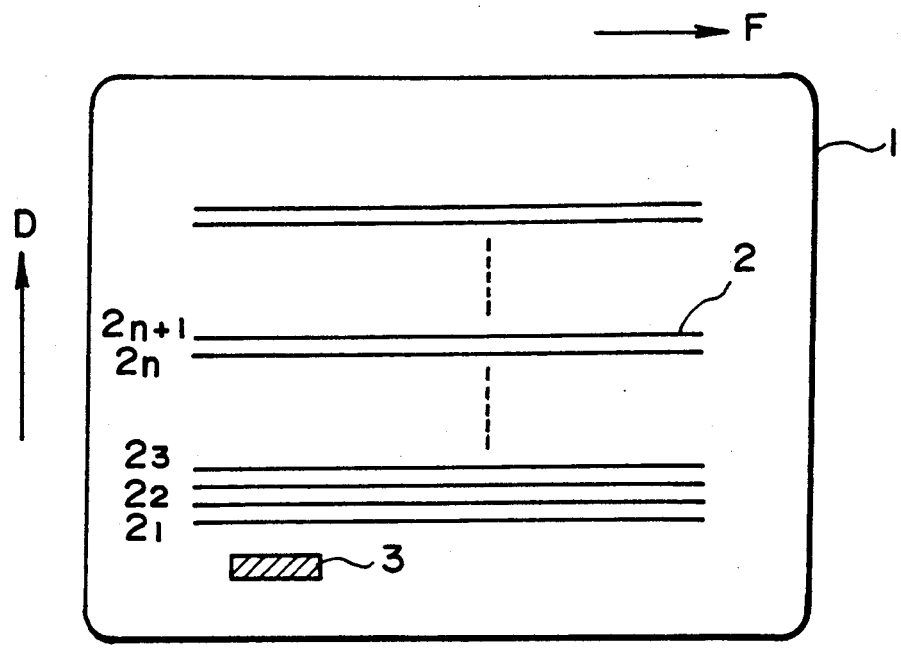
FIG. 1 is a schematic plan view of an optical card for explaining a conventional recording method.
Figure 2:
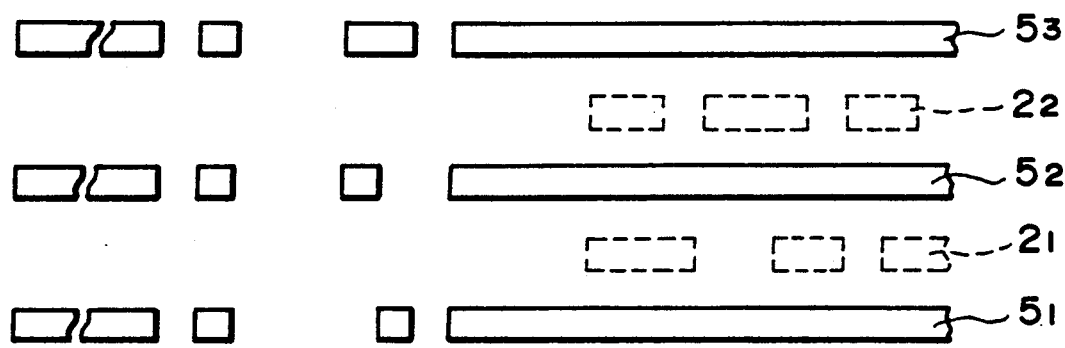
FIG. 2 is a partial enlarged view of the optical card of FIG. 1.
Figure 3:
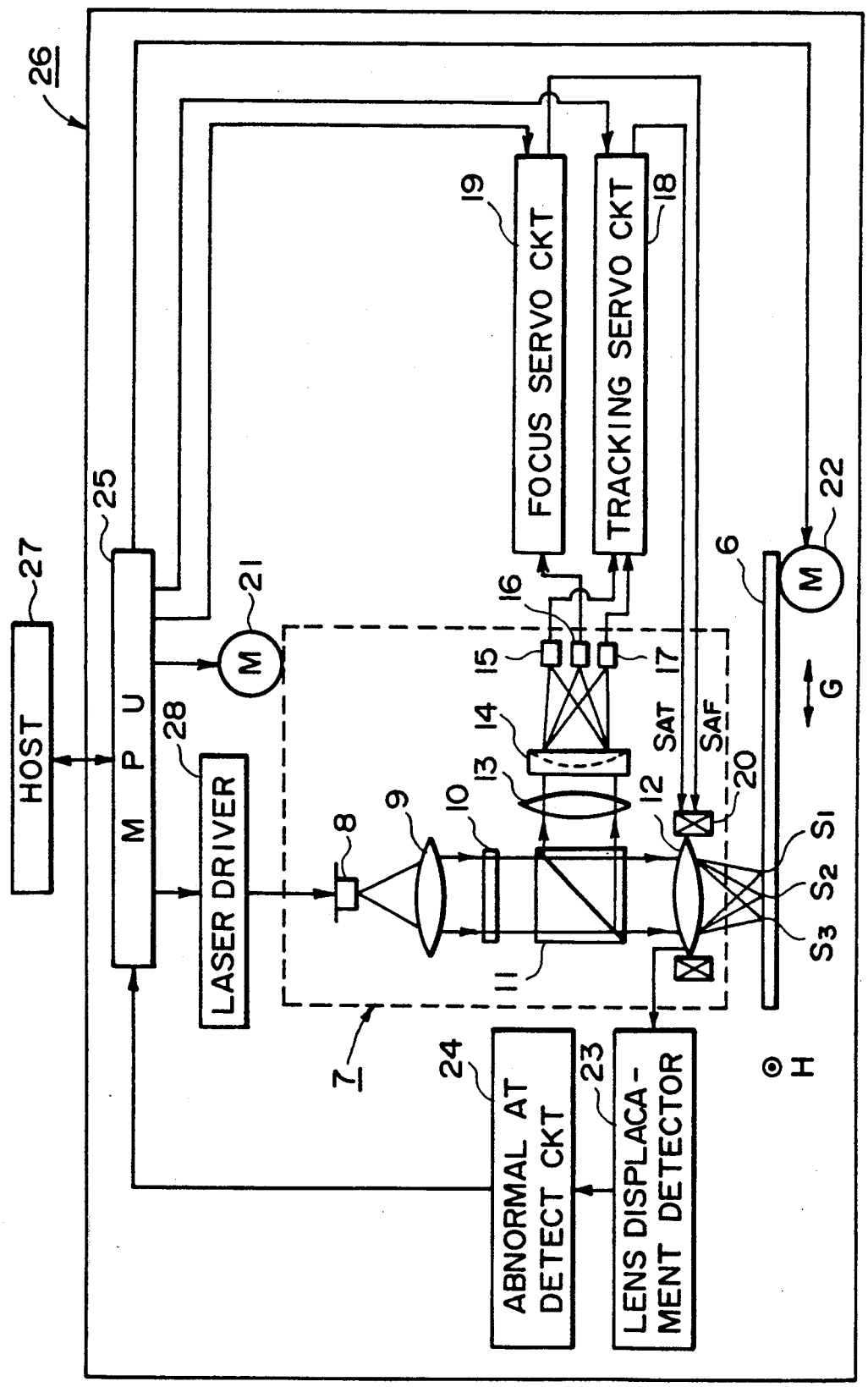
FIG. 3 is a schematic view showing a construction of an information recording apparatus according to an embodiment of the present invention.

The present invention will now be explained in detail with reference to the attached drawings FIG. 3 is a schematic view showing a construction of an information recording apparatus according to a preferred embodiment of the present invention. In the illustrated embodiment, a recording medium comprises an optical card 6 onto which light beams are applied by means of an optical head 7. The light beams are obtained from light emitted by a semiconductor laser unit 8 arranged in the optical head 7. More particularly, the light emitted from the semi-conductor laser unit 8 is changed to parallel rays by means of a collimator lens 9 and then is divided into three light beams by a diffraction grid 10. The divided light beams pass through a beam splitter 11 and then are applied onto the optical card 6 by means of an objective lens 12 to form light spots S1, S2 and S3 on the optical card. Reflected light beams of these light spots (reflected on the optical card) are reflected by the beam splitter 11 and then are received by corresponding light detectors 15, 16 and 17, respectively, through a condenser lens 13 and a cylindrical lens 14. Outputs of the light detectors 15 and 17 are sent to a tracking servo circuit 18 from which a tracking signal $S_{AT}$ is emitted; whereas an output of the light detector 16 is sent to a focusing servo circuit 19 from which a focusing signal $S_{AF}$ is emitted. These signals are sent to a lens actuator 20. The lens actuator 20 performs a focusing operation and a tracking operation by shifting the objective lens in a direction parallel to an optical axis of the objective lens and in a direction perpendicular to the optical axis, respectively The optical head 7, in which the above-mentioned lens actuator 20 and the like are housed, can be shifted in a direction (direction H shown in FIG. 4) perpendicular to a plane of FIG. 3 by means of a stepping motor 21. On the other hand, the optical card 6 can be shifted in a direction G (FIG. 4) by means of a motor 22. In association with the objective lens 12, a lens displacement detector 23 is provided for detecting displacement of the objective lens in the tracking direction G. An abnormal AT detecting circuit 24 connected to the lens displacement detector 23 detects abnormality of the tracking servo from an output of the detector 23 and then sends a detected signal to a micro-processing unit (MPU) 25. The MPU 25 is connected to the focusing servo circuit 19, the tracking servo circuit 18, the stepping motor 21 and the motor 22 to control the operation of these elements Information to be recorded is inputted to the MPU 25 by means of a host computer 27 connected to a drive device 26 including all of the above-mentioned elements The MPU 25 energizes or drives the semi-conductor laser unit 8 through a laser drive circuit 28 on the basis of the information.

FIG. 4 shows the optical card 6 as a plan view thereof. The optical card 6 comprises a substrate made of plastic material and the like, and a recording layer 29 of silver salt, color, chalcogen type and the like deposited or coated on the substrate. A plurality of optically detectable tracking tracks 30 are formed on the recording layer 29 by providing unevenness between the track portions and the remaining portions or by differentiating reflection factor of the tracking portions from that of the remaining portions These tracking tracks 30 are positioned parallel to and equidistant from each other. Between the two adjacent tracking tracks, there is provided a recording area on which information is recorded.

Figure 6:
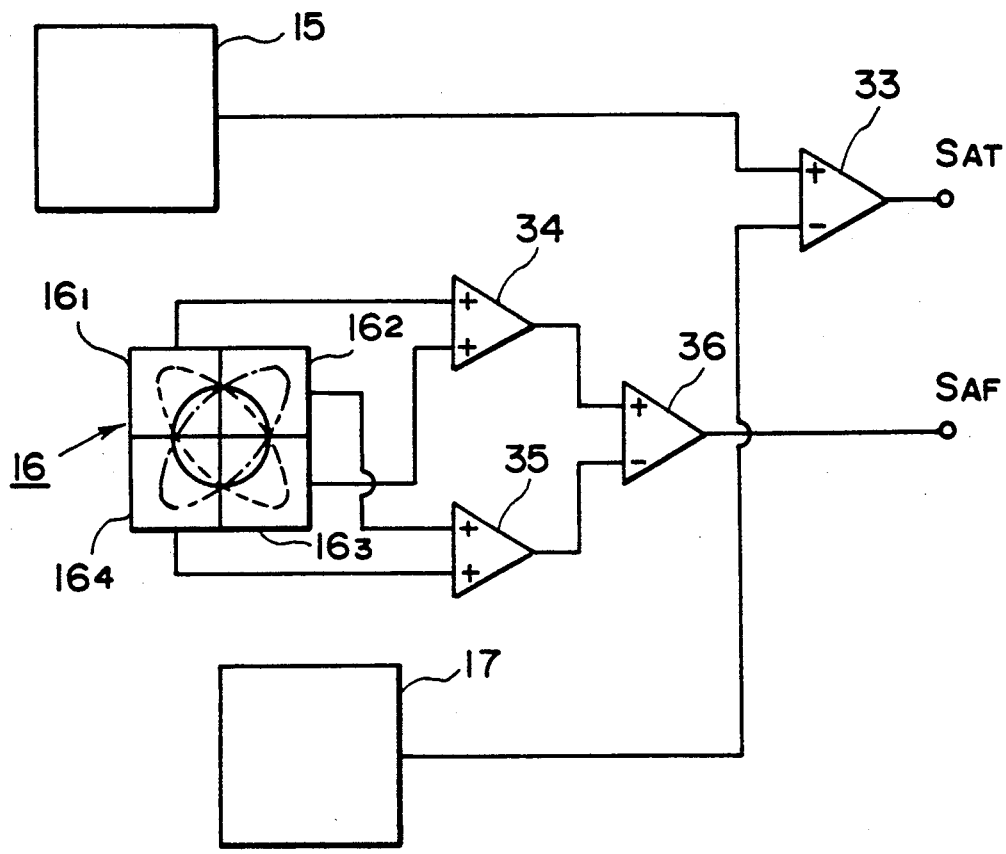
FIG. 6 is a block diagram showing servo circuits in the apparatus of FIG. 3.

FIG. 5 shows a portion of the recording layer of the optical card, in an enlarged scale, for explaining the recording process performed by the information recording apparatus shown in FIG. 3, and FIG. 6 shows an embodiment of the tracking servo circuit and the focusing servo circuit in the recording apparatus of FIG. 3. In FIG. 5, the recording area $31_1$ is positioned between the tracking tracks $30_1$ and $30_2$, and the recording area 31 is positioned between the tracking tracks $30_2$ and $30_3$. The light spots or beam spots S1 and S3 are partially applied to the tracking tracks $30_1$ and $30_2$, respectively, and the beam spot S2 is applied to the recording area $31_1$. In this condition, if the positions of the beam spots S1–S3 on the optical card are deviated in a direction perpendicular to a longitudinal direction of the track, an unbalance is generated or created between an amount of light of the reflected beam from the spot S1 and that of the reflected beam from the spot S3. Thus, as shown in FIG. 6, when the outputs of the light detectors which receive the reflected light beams from the spots S1 and S3, respectively, are sent to a differential amplifier 33 by which the balance between these outputs is clarified, the tracking signal $S_{AT}$ indicating an amount and direction of such deviation can be obtained Further, by performing the automatic tracking (AT) operation on the basis of the tracking signal $S_{AT}$, the beam spot S2 can be accurately positioned or directed to a desired tracking area between the tracking tracks $30_1$ and $30_2$, thereby recording the information on the recording area as shown by bits 32. When the information is to be recorded on the recording area $31_2$, the beam spots S1, S2 and S3 may be applied to the tracking track $30_1$, the recording area $31_2$ and the tracking track $30_2$, respectively.

On the other hand, the focusing servo operation can be performed by a so-called "astigmatism" method The reflected light beam from the light spot on the optical card is undergone astigmatism by the cylindrical lens 14 (FIG. 3). Thus, when a focal position of the light spot is deviated or shifted forwardly or rearwardly, a configuration of the spot received by the light detector 16 is changed to an elliptic one as shown by a bloken line or an alternate long and short dash line as shown in FIG.

6 Therefore, the light acceptance surface of the detector is divided into four portions $16_1$–$16_4$; the sum of the outputs of the portions $16_1$–$16_3$ is calculated by an adder 34, and the sum of the outputs of the portions $16_2$ and $16_4$ is similarly calculated by an adder 35; the balance between these sums is clarified by a differential amplifier 36, thereby obtaining the focusing signal $S_{AF}$ as an output of the differential amplifier.

Figure 7:
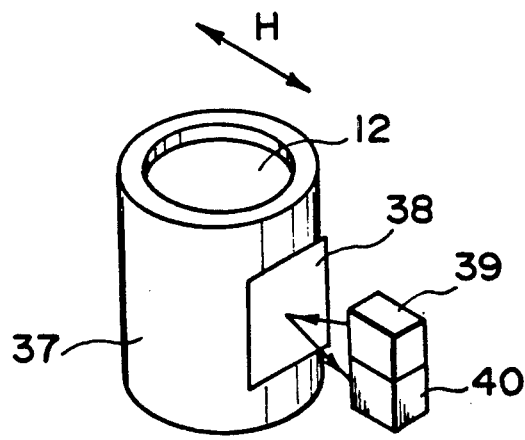
FIG. 7 is a perspective view showing an embodiment of a lens displacement detector in the apparatus of FIG. 3.

FIG. 7 is a schematic perspective view showing an embodiment of the lens displacement detector shown in FIG. 3. A lens-barrel 37 for holding the objective lens 12 is provided with a reflection surface 38 A luminous diode 39 emits a light beam toward the reflection surface; the reflected light beam is received by a photo-diode 40. When the objective lens 12 is shifted in the tracking direction H, an amount of light received by the photo-diode 40 is changed accordingly. Thus, it is possible to detect the displacement of the objective lens 12 on the basis of the change in the amount of light.

FIG. 8 shows an embodiment of the abnormal AT detecting circuit in the recording apparatus of FIG. 3, and FIGS. 9A to 9C show wave shapes for explaining the operation of the abnormal AT detecting circuit. The output signal St emitted from the lens displacement detector 23 has a wave shape as shown in FIG. 9A, this output signal being inputted to a speed detecting circuit 41 from where a voltage signal Sv (FIG. 9B) in proportion to a relative speed between the objective lens 12 and a body of the optical head 7 is outputted. The voltage signal Sv is compared with a comparison voltage V$\phi$ by means of a comparator 42. When the voltage signal Sv is larger than the voltage V$\phi$, that is to say, when the moving speed of the objective lens is larger than a predetermined value, the comparator 42 sends an abnormal detecting signal Sh (FIG. 9C) to the MPU 25 indicating that abnormality is generated in the tracking servo operation.

Figure 10:
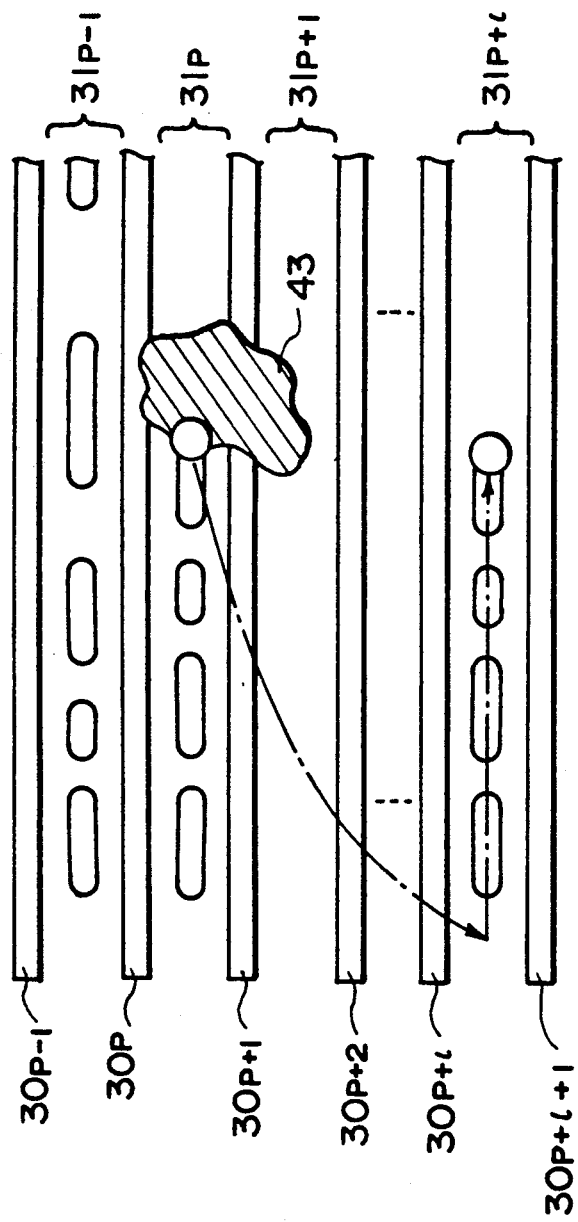
FIG. 10 is a partial enlarged view of the optical card for explaining the recording method of the present invention.
Figure 11:
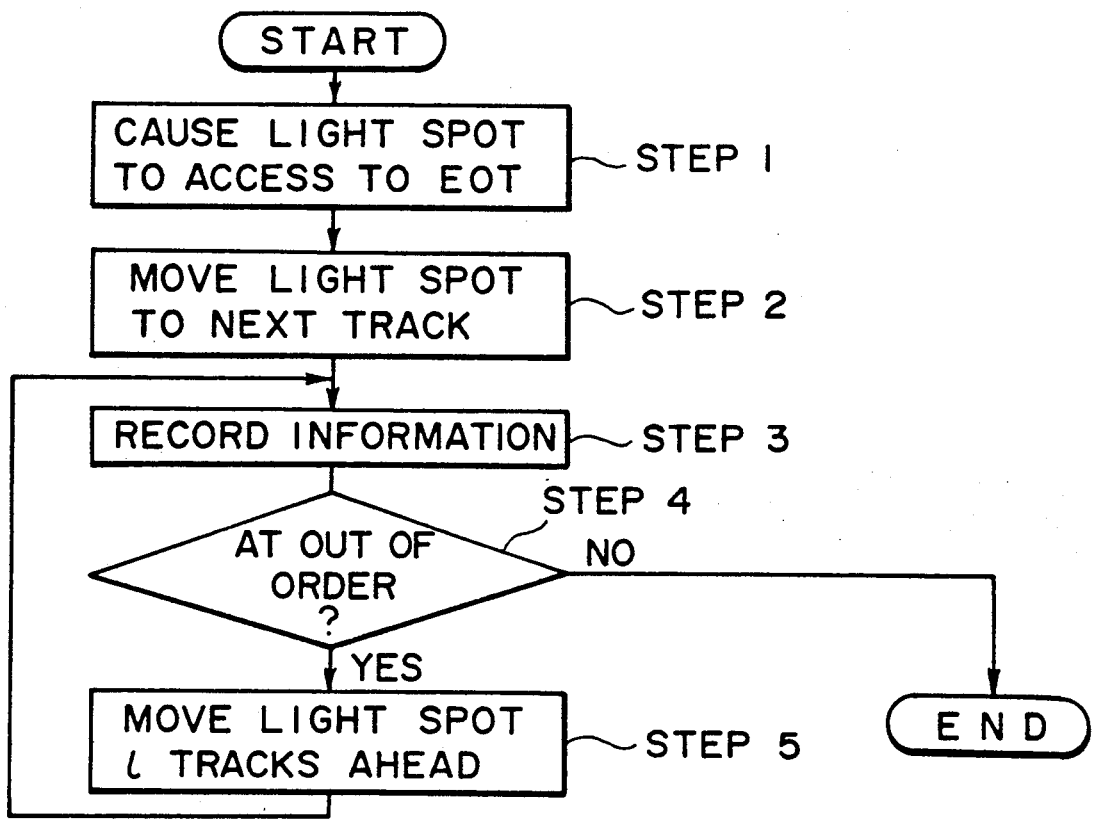
FIG. 11 is a flow chart showing a recording process of the recording method according to an embodiment of the present invention.

Next, the information recording method according to the present invention will be explained with reference to FIG. 3 and FIGS. 10-11. Here, FIG. 10 shows, in an enlarged scale, a portion of the recording layer of the optical card 6, where the tracking tracks $30_{p-1}$, $30_p$, $30_{p+1}$, $30_{p+2}$, ..., $30_{p+l}$, $30_{p+l}$, the recording areas (information tracks) $31_{p-1}$, $31_p$, $31_{p+1}$, ..., $31_{p+l}$ and a defect portion 43 are shown. And, FIG. 11 is a flow chart showing the recording process.

When the MPU 25 receives an instruction for starting the recording of the information from the host computer 27, it energizes the motor 21 to shift the optical head 7 in the direction H, thereby causing the light spot to access to the last information track (end of track) (referred to as "EOT" hereinafter) on which the information has most recently been recorded, in a step 1 shown in FIG. 11. In FIG. 10, the EOT corresponds to the recording track $31_{p-1}$. On each of the information tracks on which the information has been recorded, a corresponding track number (address number) has also been recorded The MPU 25 performs the access operation while comparing the track number of the EOT read out from a directory with a track number of the track which is reproduced by the light spot Next, in a step 2 shown in FIG. 11, the lens actuator 20 is driven by the MPU 25 through the tracking servo circuit 18 to move or shift the light spot to a next information track $31_p$. In a step 3, the information is recorded on the information track $31_p$ by shifting the optical card 6 in the direction G by means of the motor 22 while modulating the light beam from the semi-conductor laser unit 8 on the basis of the recording signal.

In a step 4, the existence of the abnormality of the tracking servo during the recording operation is detected by the abnormal AT detecting circuit 24. If the automatic tracking (AT) is not out of order (i.e., is not deviated) until the recording of the information is completed, the recording operation will by over. On the other hand, if the AT is out of order due to the presence of the defect portion 43 as shown in FIG. 10, the abnormal AT detecting circuit 24 detects the abnormality and sends the abnormal detecting signal to the MPU 25 by which the recording operation is stopped immediately. Next, in a step 5, the MPU 25 energizes the stepping motor 21 to shift the optical head 7 in the direction H in such a manner that the light spot is moved to the information track $31_{p+l}$ which is positioned l tracks ahead (lth tack beyond the track $31_1$.) THen, returning to the step 3, the same information as that to be recorded on the track $31_p$ is recorded on the information track $31_{p+l}$. Thereafter, the recording operation is repeated through the steps 3–5 (or is over, if there is no further defect portion).

The above-mentioned value ( is an integral number more than two (including two); the value ( can be appropriately determined on the basis of ability of the used recording medium (for example, sizes of the defect portions), AT feature of the recording apparatus and the like If the selected value ( is too small, there is a greater possibility that the AT is out of order again in the new information track to which the light spot is moved On the other hand, if the selected value l is too large, recording capacity will considerably be decreased. Thus, preferably, the value l is selected at 3–5. Here, it should be noted that, when there arises an error in a position reached by the light spot by an amount corresponding to q tracks due to a feed error of the stepping motor 21 for shifting the optical head 7, the value l should be so selected that it is larger than the value q (l>q), thereby preventing the light spot from recording on the already recorded information track.

Figure 12:
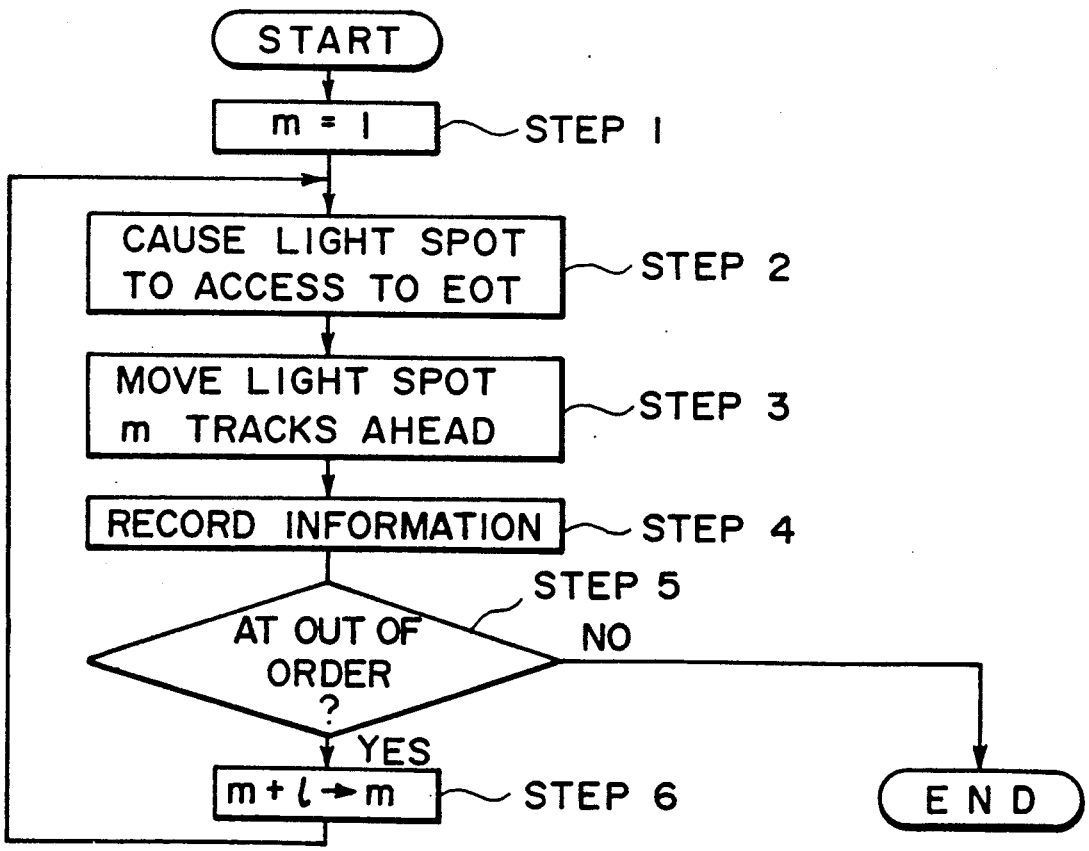
FIG. 12 is a flow chart showing a recording process of the recording method according to another embodiment of the present invention.

FIG. 12 is a flow chart showing another embodiment of the information recording method of the present invention. A recording process of this embodiment will now be explained with reference to FIG. 3, FIG. 10 and FIG. 12. In a step 1 shown in FIG. 12, a value m (similar to () is set to one (m=1) by, for example, a memory (not shown) provided in the recording apparatus. Then, in a step 2, the light spot is caused to access to the EOT, and in a step 3, (since m=1) the light spot is moved to a next information track (next to EOT), and then, in a step 4, information is recorded on the information track $31_p$. In a step 5, if the AT is not out of order during the recording operation, the recording operation is continued until the recording of the information is completed; on the other hand, when the AT is out of order, a next step 6 is initiated. The operations performed in the steps 2 to 5 shown in FIG. 12 are the same as those performed in the steps 1 to 4 already explained and shown in FIG. 11.

In the step 5 shown in FIG. 12, if the AT is out of order during the recording operation, a value m+l is set to m (here, l is an integral number more than two) in the step 6. Thereafter, returning to the step 2, the light spot is caused to access to the EOT track $31_{p-1}$. Then, in the step 3, the light spot is moved to the track $31_{p+l}$ which is positioned m tracks ahead (and, accordingly, (l+1) tracks ahead) Thereafter, in the step 4, the same information as that to be recorded on the track $31_p$ is recorded on the information track $31_{p+l}$. Thereafter, the recording operation is performed through the step 5, and is repeated (if the AT is out of order again) or is completed (if the AT is not out of order).

The embodiment shown in FIG. 12 differs from that shown in FIG. 11 in the point that, in the embodiment of FIG. 12, if the AT is out of order, the light spot is caused to access to the EOT before the information is recorded again According to the embodiment of FIG. 12, since the position of the light spot is ascertained or reassured by the EOT every time when the AT is out of order, even if the light spot is widely or considerably moved due to the AT being out of order, the danger that the light spot records the information on an already recorded track can be prevented.

In the present invention, various modifications other than the illustrated embodiments can be adopted. For example, although the movement of the light spot for the re-recording is effected by means of the optical head in the illustrated embodiments, the light spot may be moved by shifting the objective lens in the tracking direction by means of the lens actuator. Further, the present invention is not limited to the recording by means of the light spot, but can be applied to other recording apparatuses and/or methods such as a magnetic recording apparatus and the like. Furthermore, the recording medium is not limited to a card-shaped recording medium such as the optical card, but may be other ones such as recording discs, recording tapes and the like. When the recording disc (disc-shaped recording medium) is used, information tracks may be concentrically arranged, or a spiral information track may be provided. In the case of the spiral information track, it can be considered that adjacent recording tracks are continuously connected to each other. Such a spiral track is, of course, included in the scope of the present invention.

The present invention includes all of the modifications and variations without departure from the scope of the appended claims.

What is claimed is:

1. An information recording apparatus for recording information on an information recording medium on which a plurality of tracks are provided in parallel with each other, said apparatus comprising:
    recording means for recording information on one of the tracks;
    shifting means for shifting said recording means onto another track;
    tracking servo means for performing a tracking servo operation of said recording means with respect to a track;
    detecting means for detecting an abnormality of the tracking servo operation; and
    control means for controlling said shifting means, causing said recording means to move to a new track positioned at least two tracks ahead of a track in which an abnormality is detected in a direction on the medium in which no information is recorded; when said detecting means detects the abnormality of the tracking servo operation, whereby, prior to recording any additional information, said recording means records again, on the new track, the same information to be recorded on the track at which the abnormality is detected.

2. An information recording apparatus according to claim 1, wherein said recording means comprises a light beam applied to the track and modulated on the basis of information to be recorded.

3. An information recording apparatus according to claim 2, wherein said shifting means comprises a motor for shifting an optical head from which said light beam is emitted in a direction transverse to the track.

4. An information recording apparatus according to claim 2, wherein said shifting means comprises an actuator for shifting an objective lens by which said light beam is condensed on said information recording medium, in a direction transverse to the track.

5. An information recording apparatus according to claim 2, wherein said tracking servo means comprises means for detecting a tracking signal, and an actuator for shifting an objective lens by which said light beam is condensed on the information recording medium, in a direction transverse to the track, in accordance with the tracking signal.

6. An information recording apparatus according to claim 2, wherein said information recording medium comprises a card-like optical information recording medium.

7. An information recording apparatus for recording information on an information recording medium on which a plurality of tracks are provided in parallel with each other, comprising:
    recording means for recording information on one side of the tracks;
    shifting means for shifting said recording means onto another track;
    tracking servo means for performing a tracking servo operation of said recording means with respect to a track;
    detecting means for detecting an abnormality of the tracking servo operation, said detecting means comprising means for detecting a speed of movement of an objective lens by the tracking servo operation and means for comparing the detected speed with a predetermined value which corresponds to the moving speed of the objective lens at a time when a normal tracking servo operation is performed; and
    control means for controlling said shifting means, causing said recording means to move to a new track positioned at least two tracks ahead of a track in which an abnormality is detected, in a direction on the medium in which no information is recorded, when said detecting means detects the abnormality of the tracking servo operation, whereby said recording means records again, on the new track, the same information to be recorded when the abnormality is detected.

8. An information recording apparatus according to claim 7, wherein said recording means comprises a light beam applied to the track and modulated on the basis of information to be recorded.

9. An information recording apparatus according to claim 8, wherein said shifting means comprises a motor for shifting an optical head from which said light beam is emitted, in a direction transverse to the track.

10. An information recording apparatus according to claim 8, wherein said shifting means comprises an actuator for shifting the objective lens by which said light beam is condensed on the information recording medium, in a direction transverse to the track.

11. An information recording apparatus according to claim 8, wherein said tracking servo means comprises detecting means for detecting a tracking signal and an actuator for shifting an objective lens by which said light beam is condensed on the information recording medium, in a direction transverse to the track, in accordance with the tracking signal.

12. An information recording apparatus according to claim 7, wherein the information recording medium comprises a card-like optical information recording medium.

13. An information recording method comprising the steps of:
recording information on one of a plurality of tracks which are provided in parallel with each other on an information recording medium; performing a tracking servo operation while recording the information;
recording information, following the information recorded, on a next track in a direction on the recording medium in which no information is recorded, subsequent to the completion of recording information on the one track; and
momentarily stopping recording when an abnormality of the tracking servo operation is generated and recording again, on a new track, prior to recording any additional information, the same information to be recorded on a track in which the abnormality is generated, the new track being positioned at least two tracks ahead of the track in which the abnormality is generated, in a direction on the medium in which no information is recorded.

14. An information recording method in which information is recorded, on an information recording medium on which a plurality of tracks are provided in parallel, by using an apparatus including recording means, said method comprising the steps of:
causing the recording means to perform a tracking servo operation by tracking one of the plurality of tracks;
causing the recording means to record information on said one of the tracks;
moving the recording means to a next track in a direction on the medium in which no information is recorded, subsequent to completion of recording on said one of the tracks and recording information following the information recorded on said one of the tracks;
momentarily stopping the recording of information when a tracking abnormality is generated during the recording of information;
accessing the recording means to a last track positioned one track preceding the track in which the tracking abnormality is generated while the recording is momentarily stopped; and
moving the recording means to a new track, positioned at least two tracks ahead of the accessed last track, in a direction on the medium in which no information is recorded and prior to recording any additional information, recording again, on the new track, the same information to be recorded when the tracking abnormality is generated.

* * * * *

UNITED STATES PATENT AND TRADEMARK OFFICE
CERTIFICATE OF CORRECTION

PATENT NO. : 5,018,124

DATED : May 21, 1991

INVENTOR(S) : YUTAKA OGASAWARA, ET AL.

Page 1 of 4

It is certified that error appears in the above-identified patent and that said Letters Patent is hereby corrected as shown below:

IN THE ABSTRACT

Line 12, "tracks," should read --tracks;--.

IN THE DRAWINGS

SHEET 2

FIG. 3, "DISPLACAMENT" should read --DISPLACEMENT--.

COLUMN 1

Line 20, "discshaped" should read --disc-shaped--;
Line 49, "spot," should read --spot--;
Line 53, "bent" should read --a bend--;
Line 56, "abovemen-" should read --above-men- --; and
Line 63, "scans," should read --scans--.

UNITED STATES PATENT AND TRADEMARK OFFICE
CERTIFICATE OF CORRECTION

PATENT NO. : 5,018,124            Page 2 of 4

DATED     : May 21, 1991

INVENTOR(S) : YUTAKA OGASAWARA, ET AL.

It is certified that error appears in the above-identified patent and that said Letters Patent is hereby corrected as shown below:

COLUMN 3

Line 57, "respectively" should read --respectively.--.

COLUMN 4

Line 6, "elements" should read --elements.--;
Line 9, "elements" should read --elements.--;
Line 21, "portions" should read --portions.--;
Line 34, "area 31" should read --area $31_2$--;
Line 49, "obtained" should read --obtained.--;
Line 61, "method" should read --method.--; and
Line 67, "bloken" should read --broken--.

COLUMN 5

Line 1, "6 Therefore," should read --6. Therefore,--;
Line 3, "portions $16_1$-$16_3$" should read --portions $16_1$ and $16_3$--;
Line 12, "38 A" should read --38. A--;
Line 44, "$30_{p+l}$," should read --$30_{p+l+1}$,--;
Line 59, "recorded" should read --recorded.--; and
Line 62, "spot" should read --spot.--.

UNITED STATES PATENT AND TRADEMARK OFFICE
CERTIFICATE OF CORRECTION

PATENT NO. : 5,018,124

DATED : May 21, 1991

INVENTOR(S) : YUTAKA OGASAWARA, ET AL.

It is certified that error appears in the above-identified patent and that said Letters Patent is hereby corrected as shown below:

COLUMN 6

Line 8, "by" should read --be--;
Line 18, "tack" should read --track--, and "track $31_1$.) THen," should read --track $31_p$). Then,--;
Line 24, "value (" should read --value $\ell$ --;
Line 25, "value (" should read --value $\ell$ --;
Line 29, "like If" should read --like. If--, and "value (" should read --value $\ell$ --;
Line 32, "moved On" should read --moved. On--;
Line 47, "to O" should read --to $\ell$)--; and
Line 67, "ahead) Thereafter," should read --ahead). Thereafter,--.

COLUMN 7

Line 9, "again According" should read --again. According--; and
Line 61, "corded;" should read --corded,--.

COLUMN 8

Line 6, "emitted" should read --emitted,--;

UNITED STATES PATENT AND TRADEMARK OFFICE
CERTIFICATE OF CORRECTION

PATENT NO. : 5,018,124

DATED : May 21, 1991

INVENTOR(S) : YUTAKA OGASAWARA, ET AL.

It is certified that error appears in the above-identified patent and that said Letters Patent is hereby corrected as shown below:

COLUMN 9

Line 14, "medium; performing" should read
--medium;
    performing--;

Signed and Sealed this

Twenty-second Day of December, 1992

Attest:

DOUGLAS B. COMER

*Attesting Officer*     *Acting Commissioner of Patents and Trademarks*